G. BASSETT.

Improvement in Concrete Pavements.

No. 5,586.

Reissued Oct. 7, 1873.

Witnesses:

Thos. G. Bassett

J. W. Todd

Inventor:

Geo Bassett.

UNITED STATES PATENT OFFICE.

GEORGE BASSETT, OF SYRACUSE, NEW YORK, ASSIGNOR OF ONE-HALF INTEREST TO THOMAS G. BASSETT.

IMPROVEMENT IN CONCRETE PAVEMENTS.

Specification forming part of Letters Patent No. 132,620, dated October 29, 1872; reissue No. 5,586, dated October 7, 1873; application filed August 16, 1873.

*To all whom it may concern:*

Be it known that I, GEORGE BASSETT, of Syracuse, in the county of Onondaga and State of New York, have invented a new and useful Improvement in Concrete Pavements, of which the following is a specification:

This invention consists in the use of mortar of calcined plaster, or of lime and plaster, or other mixture of which calcined plaster forms an important part, for the purpose of separating concrete pavement into separate blocks by a joint which will break or otherwise separate from the concrete blocks easily in case it becomes necessary to remove any of the blocks to level up the walk or for other purposes. It is also desirable that the substance used for the joints shall crumble or waste by the action of the atmosphere, or at any rate crumble easily by the pressure of the blocks when being lifted out from between others, so as to relieve the corners of the blocks, which are very liable to be broken off by any tenacious joint material, such as paper and the like. The invention also consists of a method of forming these joints of plaster by the use of a straight-edge laid on the top of the prepared section of concrete, so as to project beyond the width of the required separating-strip to protect the soft edge of the block while the plaster is being applied, and as the gage for the tool used for applying the plaster to regulate the thickness of the latter and aid in making it straight; also to make plaster exactly even on the top with the surface of the concrete blocks.

Figure 1:
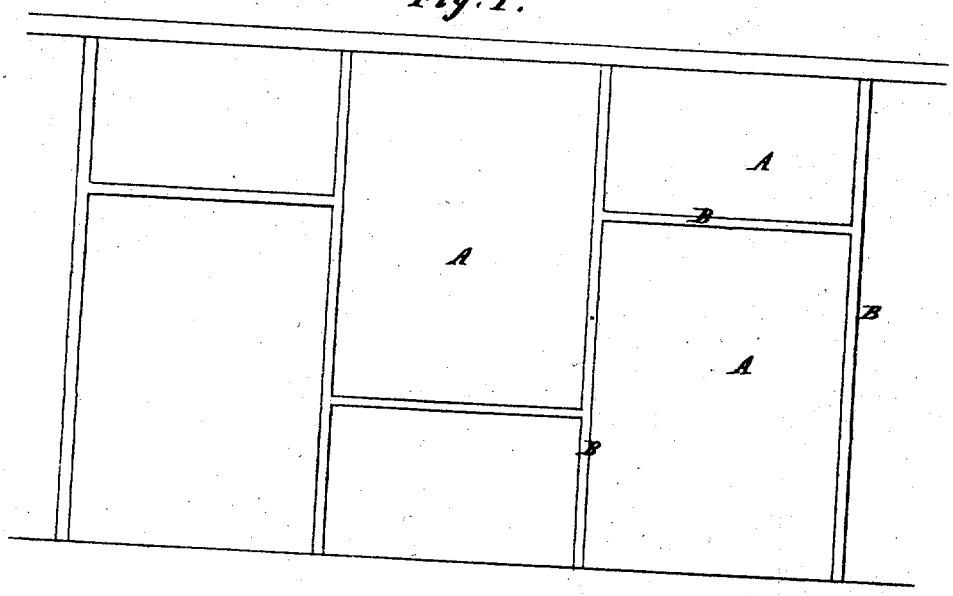
Figure 2:
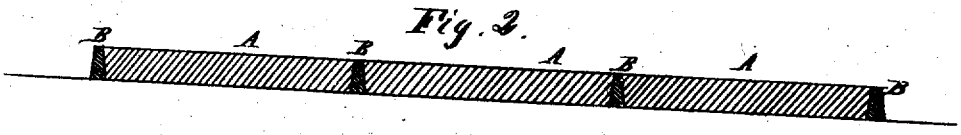

Figure 1 is a plan view of the pavement, and Fig. 2 is a vertical section.

Similar letters of reference indicate corresponding parts.

A A are the blocks, and B B the joints of calcined plaster.

The manner of constructing the pavement is as follows: First, with strips of board, make an inclosure the size of the block to be formed; fill this inclosure with concrete and finish the block; then remove the inclosure and the first block is formed; then take a strip of board with a straight edge and lay it on the top of the block already formed, letting the straight edge project over the edge of the block the required thickness of joint, and with a common trowel spread a layer of mortar made of calcined plaster on the edge of the block, flush with the edge of the strip already described. This joint hardens immediately, and another block can be formed at once, and the work in this manner be carried on continuously; however, two sections of pavement can be carried on at the same time, and by laying blocks on the two sections alternately, more time be gained for the blocks to harden or set.

By the use of the plaster joint it can be made thicker at the bottom, so that when necessary to remove a block it can be done easier than when the joint is of a uniform thickness, and the joint becoming hard as soon as made, it forms a protection for the edge of the new block, so that the edges can be made perfect with little care or labor.

Having thus described my invention, I claim as new and desire to secure by Letters Patent—

1. The concrete-pavement blocks A, united with joints B of calcined plaster, substantially as specified.

2. The method of constructing the joints of calcined plaster or other cement by plastering it on the edges of the concrete blocks under a projecting straight-edge so as to gage both the height and width of the joint of cement, substantially as specified.

3. The joint B, made thicker at the bottom than at top, as and for the purpose specified.

GEORGE BASSETT.

Witnesses:
WM. H. GUNN,
THOS. G. BASSETT.